_United States Patent_ [19]

Hasei

[11] 3,967,022

[45] June 29, 1976

[54] ADHESIVE LABEL

[76] Inventor: Taeko Hasei, 25 Go 4 Ban, Ekimae cho 2-chome, Okayama, Japan

[22] Filed: Apr. 25, 1975

[21] Appl. No.: 571,848

[30] Foreign Application Priority Data

May 2, 1974   Japan.............................. 49-049897

[52] U.S. Cl.................................. 428/40; 40/2 R; 283/18; 283/21; 428/202; 428/204; 428/207; 428/352; 428/354
[51] Int. Cl.²...................... B32B 7/06; B32B 7/12; G09F 3/02; G09F 3/04
[58] Field of Search ............ 428/40, 352, 354, 207, 428/202, 204, 537; 283/18, 21; 40/2 R

[56] References Cited
UNITED STATES PATENTS 3,549,482   12/1970   Okutani................................ 428/40

*Primary Examiner*—J.C. Cannon
*Attorney, Agent, or Firm*—Kurt Kelman

[57] ABSTRACT

The invention makes use of unique applications of adhesive material and adhesive electrostatic qualities inherent in vinylchloride film. It provides adhesive vinylchloride labels wherein a sheet of quality paper or the like is bonded to a vinylchloride film by an adhesive coating. These three components are covered on their lower surface by a flat backing board for protection against soiling.

The label may be attached to any desired surface by means of adhesive material, or any desired smooth surface by means of the electrostatic properties of vinylchloride film without the use of adhesive material.

6 Claims, 6 Drawing Figures

U.S. Patent June 29, 1976 3,967,022

ADHESIVE LABEL

This invention relates to an adhesive label consisting of a vinylchloride film coated with an adhesive agent over the upper surface thereof, a sheet of paper or the like bonded thereto, and a flat backing board to which said vinylchloride film adheres by its inherent adhesive property, thus forming a laminated sheet which may be suitably cut out or punched out according to the pattern, figure, character, symbol or the like printed on said paper sheet, to make a label which may be widely usable in the fields of pleasure, study, advertising or propaganda.

Figure 1:
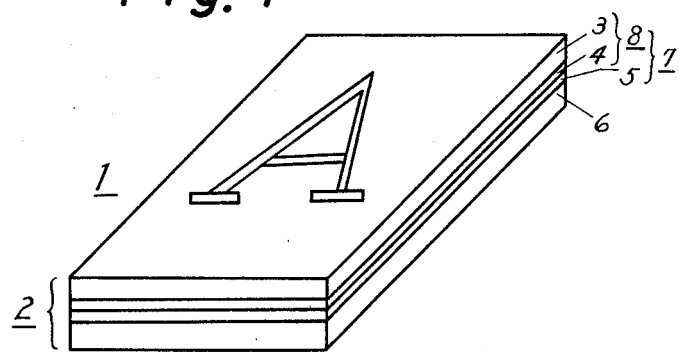
Figure 2:
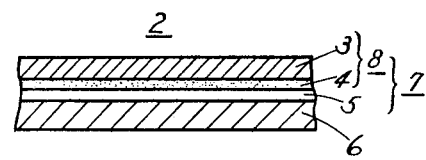
Figure 3:
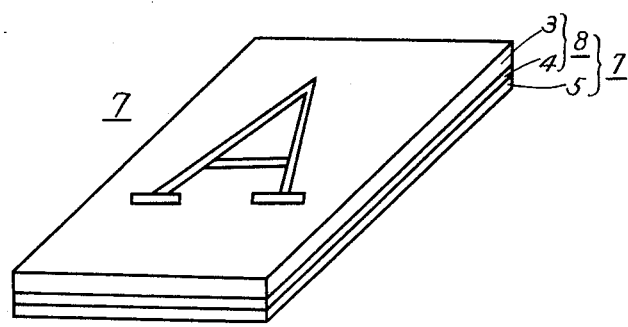
Figure 4:
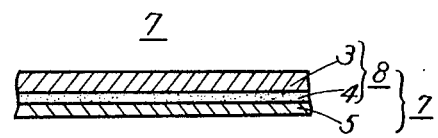
Figure 5:
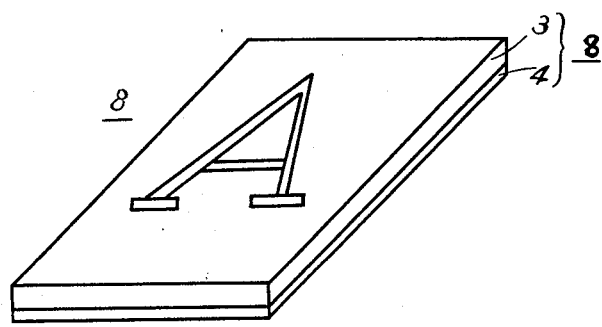
Figure 6:
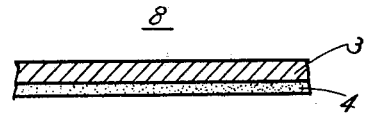

The above and other objects, advantages and features of the invention will become more apparent from the following detailed description of one now preferred embodiment thereof, taken in conjunction with the accompanying drawing wherein FIGS. 1 and 2 are a perspective view and an enlarged sectional view, respectively, of a laminate according to this invention, FIGS. 3 and 4 are a perspective view and an enlarged sectional view, respectively, of an adhesive label consisting of a vinylchloride film coated with an adhesive agent, and paper or the like bonded thereto, FIGS. 5 and 6 are a perspective view and an enlarged sectional view, respectively, of an adhesive label of paper or the like having an adhesive agent coated on the back surface thereof.

In FIGS. 1 and 2, 3 is a quality paper, synthetic paper, resin film or the like (referred to as paper or the like hereinafter), the back surface of which is coated with an adhesive agent 4, paper 3 being bonded to a film of vinylchloride 5. A flat board 6 serves to as a protection for the vinylchloride film which sticks to the surface of the board by aid of the inherent adhesive or adsorptive property thereof without a bonding agent. Top sheet 3 of resultant laminate 2 may be printed with a pattern, figure, character, symbol or the like on either surface, and the laminated sheet 2 may be suitably cut out, punched out or cut to make any label 1 according to this invention. FIGS. 3 and 4 show label 7 stripped off backing board 6. Such a label has the following characteristics:

1. The vinylchloride film 5 and the paper or the like 3 are unified by the adhesive agent 4 into one body (this united sheet will be referred to as vinylchloride adhesive sheet 7 hereinafter). The vinylchloride film 5 is coated with a releasing agent, such as silicone resin, or such a releasing agent is incorporated therein in the course of manufacturing so that, if the paper or the like 3 be separated from the vinylchloride film 5, the adhesive agent 4 will be transferred on to the paper or the like 3, consequently obtaining an adhesive label 8 of a paper or the like 3 coated with an adhesive agent over the back side thereof (FIG. 5 showing the appearance thereof in a perspective view and FIG. 6 showing an enlarged sectional view thereof). This may be conveniently adhered to any suitable object by means of the adhesive agent 4 and also peelable if necessary.

2. The vinylchloride film 5 may be of a soft vinylchloride or a hard vinylchloride, the former being inherently adherent by itself to any glossy surface and the latter being bondable, with slight pressure from above, to any smooth surface including wooden ware and paper goods in addition to glossy surfaces by virtue of the electro-static attraction therebetween accordingly, the vinylchloride adhesive sheet, when stripped from backing board 6 may be stuck on a glossy or smooth surface of any object by virtue of the adhesiveness or adsorptiveness of the vinylchloride film without any possibility of damaging the surface of goods by adhesive or paste, thereby creating a neat and light appearance of such a label. Further, when a label with a hard vinylchloride film 5 is to be stuck on an object, the adsorptive tendency may be promoted by the slight rubbing of a finger making a small circle on the label put thereon, because much more static electricity would be induced by such a manipulation. The label once stuck on any object may be easily transferred as desired by the slight manipulation of a finger thereon. Thus, this label may be stuck, besides glossy or mirror surfaces, on wooden ware, paper goods or the wall surface of a room, to meet various purposes for wide application.

3. The paper or the like 3 of the vinylchloride adhesive sheet may have patterns etc. printed on the front surface thereof which may be seen from above, and the paper or the like 3 may have patterns etc. also on the back surface thereof. Such a paper or the like 3 may also be stuck on a transparent vinylchloride film 5 by means of the adhesive agent 4 to constitute a variation of vinylchloride adhesive sheet 8, which may conveniently be stuck on a transparent surface, such as a glass ware, to permit the pattern or the like on the back surface of the paper or the like 3 to be observed through the glass and the transparent vinylchloride film 5. On the paper or the like 3, a picture or character may freely be depicted, if desired, instead of being printed as stated above.

4. The vinylchloride film 5 provided at the bottom of the vinylchloride adhesive sheet 7 is apt to stick to any matter other than desired objects due to its adhesiveness or by a static charge, and dust or impurities tend to cling to it. Therefore, its bottom surface is protected by backing board 6 which may easily be separated from the vinylchloride adhesive sheet 7, when it is employed properly.

The adhesive label according to this invention may be stuck on or separated from any object, by means of an adhesive agent coated on the paper or the like, or by the sticking tendency of the vinylchloride film due to static charge and, accordingly, it may widely be used on any smooth or glossy surface of wooden ware, paper goods, walls of rooms, etc.

What is claimed is:

1. A laminate consisting of
   a flat backing board,
   one major face of a vinylchloride film removably adhered to the backing board through the inherent adhesiveness of the film and not through use of a bonding agent,
   a releasing agent on the other surface of the vinylchloride film,
   a coating of an adhesive agent on said other surface of the vinylchloride film,
   the releasing agent enabling the vinylchloride film to be peeled off the adhesive agent coating, and
   a sheet bonded to the adhesive agent coating and carrying printed information.

2. The laminate of claim 1, wherein the releasing agent is a silicone resin.

3. The laminate of claim 1, wherein the releasing agent coats said other surface.

4. The laminate of claim 1, wherein the releasing agent is incorporated into the film.

5. The laminate of claim 1, wherein the sheet is of paper.

6. The laminate of claim 1, wherein the sheet is of synthetic resin.

* * * * *